United States Patent Office 3,311,645
Patented Mar. 28, 1967

3,311,645
4-METHYL-17α-ETHINYL ESTRA-1,3,5(10)-TRIENE COMPOUNDS
Eugene L. Wittle, Ann Arbor, Mich., assignor to Parke Davis & Company, Detroit, Mich., a corporation of Michigan
No Drawing. Filed July 16, 1964, Ser. No. 383,245
5 Claims. (Cl. 260—397.5)

The present invention relates to new steroid compounds and to methods for their production. More particularly, it relates to new 4-methyl-17α-ethinylestra-1,3,5(10)-triene compounds having the formula

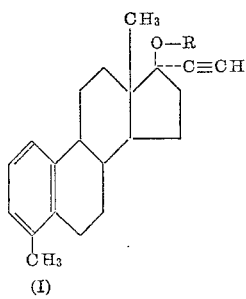

(I)

where R is hydrogen, trifluoroacetyl, or a lower alkanoyl radical having not more than 4 carbon atoms. Preferred lower alkanoyl radicals are acetyl and propionyl.

In accordance with the invention, 4-methyl-17α-ethinyl-estra-1,3,5(10)-trien-17-ol, the compound of Formula I where R is hydrogen, is prepared by reacting 4-methyl-estra-1,3,5(10)-trien-17-one with a reactive organometallic derivative of acetylene, having the formula (II)                    HC≡C—M in an anhydrous, non-reactive solvent, followed by hydroylsis of the reaction product with an aqueous medium; where M represents a metallic residue, such as an alkali metal or a magnesium halide. Preferred organometallic derivatives of acetylene for use in the reaction are ethinyl magnesium bromide, potassium acetylide and lithium acetylide. The lithium acetylide is preferably supplied to the reaction as a complex with ethylene diamine. Suitable solvents for use in the reaction include ethers, such as diethyl ether, di-n-butyl ether, tetrahydrofuran, and dioxane; aromatic hydrocarbons, such as benzene and toluene; dimethylsulfoxide; and mixtures of these. A preferred solvent for use with the lithium acetylide-ethylene diamine complex is dimethylsulfoxide. Equivalent amounts of reactants may be used, but preferably the organometallic derivative of acetylene is employed in excess. The temperature and duration of the reaction are not critical, and may be varied over a wide range. Preferred conditions are a temperature in the range of 30 to 50° C., and a duration of 2–18 hours. Following reaction of the steroid compound with the organometallic derivative of acetylene, the reaction product is hydrolyzed with an aqueous medium, such as water, dilute aqueous inorganic acids or bases or other media containing water.

Also in accordance with the invention, 4-methyl-17α-ethinylestra-1,3,5(10)-triene compounds having the formula

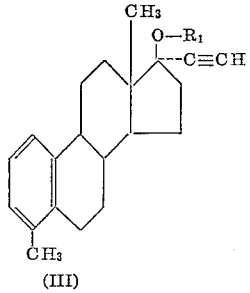

(III)

are produced by the reaction of 4-methyl-17α-ethinylestra-1,3,5(10)-trien-17-ol with a reactive derivative of an acid having the formula (IV)                    R₁—OH where $R_1$ is trifluoroacetyl or a lower alkanoyl radical having not more than 4 carbon atoms. Reactive derivatives of the acid of Formula IV that may be used include the acid halide and the acid anhydride. When the acid anhydride is used, it is preferable to add to the reaction mixture an acidic catalyst, such as p-toluenesulfonic acid. When an acid halide, preferably an acid chloride, is used, a tertiary amine catalyst, such as pyridine or triethylamine, is used in an amount sufficient to bind the hydrohalic acid liberated. Solvents are employed as follows: tertiary amines, such as pyridine and triethylamine, either alone or together with an ether, such as diethyl ether or tetrahydrofuran, or an aromatic hydrocarbon, such as benzene, may be used in the reaction with an acid halide or acid anhydride; added solvent may, however, be omitted in the reaction with an acid anhydride, in which case a several-fold excess of anhydride is used. The temperature may be varied over the range, 0–175° C., depending on the reactant and solvent employed. The preferred range for an acid halide reactant is 20–50° C., while for an acid anhydride the preferred range is 20–40° C. when an acid catalyst is added, and 40–175° C. in the absence of such a catalyst. The duration of the reaction will also vary over a wide range, depending on the reactant used. With an acid halide, the range is 2 to 24 hours, with a range of 3 to 8 hours preferred. With an acid anhydride, the reaction is normally complete in 1 to 3 hours, although a period as long as 18 hours may be required.

An alternative method for carrying out the foregoing process comprises the initial reaction of 4-methyl-17α-ethinylestra-1,3,5(10)-trien-17-ol with a lower alkyl magnesium halide, such as methylmagnesium iodide or ethylmagnesium bromide, and the subsequent reaction of the intermediate of the formula

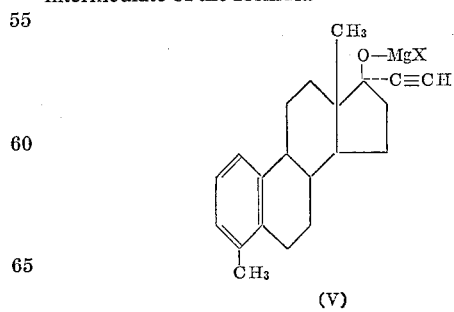

(V)

with an acid halide derivative of an acid of Formula IV, in an inert solvent, such as diethyl ether, tetrahydrofuran, or 1,2-dimethoxyethane, at a temperature in the range, 0–50° C, for a period of from 5 to 72 hours. In formula V, X represents a halogen atom.

The compounds of the invention are useful pharmacological agents. They are hypocholesteremic agents that exhibit a relatively low degree of estrogenicity. They are active upon oral administration. The preferred compounds of the invention because of their relative lack of estrogenicity are the 4-methyl-17α-ethinylestra-1,3,5(10)-triene compounds having the formula

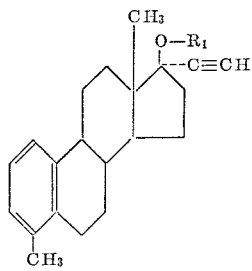

where $R_1$ is trifluoroacetyl or a lower alkanoyl radical having not more than 4 carbon atoms.

The invention is illustrated by the following examples:

*Example 1*

Over a period of one hour, dry acetylene is passed through a stirred mixture consisting of 125 ml. of an ethereal solution of ethyl magnesium bromide (prepared from 10.9 g. of ethyl bromide and 2.4 g. of magnesium in 150 ml. of ether) in 150 ml. of dry tetrohydrofuran. To the resulting solution is added with stirring a solution of 500 mg. of 4-methylestra-1,3,5(10)-trien-17-one in 75 ml. of dry tetrahydrofuran, and the reaction mixture is heated under reflux for 3 hours. After cooling, the mixture is treated, first with 100 ml. of saturated aqueous ammonium chloride, then with dilute hydrochloric acid until the aqueous phase is clear. The mixture is next concentrated under reduced pressure to remove the organic solvents, and the aqueous phase is extracted with ether. The ether extract is washed with water, dried over anhydrous magnesium sulfate, and evaporated to dryness under reduced pressure. The oily residue of 4-methyl-17α-ethinylestra-1,3,5(10)-trien-17-ol is purified by chromatography on a column prepared from 20 g. of neutral alumina, using petroleum ether and diethyl ether as eluents. The solid 4-methyl-17α-ethinylestra-1,3,5(10)-trien-17-ol obtained upon evaporation of the solvents has M.P. 134–136° C.

*Example 2*

Over a period of 5 minutes, a solution of 270 mg. of 4-methylestra-1,3,5(10)-trien-17-one in 10 ml. of dimethylsulfoxide is added to a stirred mixture of 1 g. of lithium acetylide-ethylene diamine complex in 20 ml. of dimethylsulfoxide. The reaction mixture is stirred for 2.5 hours at 40° C. and is then poured slowly with stirring into 100 ml. of ice water containing 10 ml. of concentrated hydrochloric acid. The precipitated 4-methyl-17α-ethinylestra-1,3,5(10)-trien-17-ol is isolated, washed with water, and purified by chromatography over 10 g. of neutral alumina in ether solution; M.P. 137–139° C., after crystallization from acetone; $[\alpha]_D^{24}$ —7° (2.2% in chloroform).

*Example 3*

A solution of 480 mg. of 4-methyl-17α-ethinylestra-1,3,5(10)-trien-17-ol in 25 ml of acetic anhydride is heated under reflux for 2.5 hours, and then evaporated to dryness under reduced pressure. The solid 4-methyl-17α-ethinylestra-1,3,5(10)-trien-17-ol, acetate obtained is crystallized from acetone and from ether-petroleum ether, M.P. 143–144.5° C.; $[\alpha]_D^{24}$ —8° (2% in chloroform).

*Example 4*

A solution of 300 mg. of 4-methyl-17α-ethinylestra-1,3,5(10)-trien-17-ol in 25 ml. of propionic anhydride is heated under reflux for 2 hours, and then evaporated to dryness under reduced pressure at 80° C. The solid 4-methyl-17α-ethinylestra - 1,3,5(10)-trien-17-ol, propionate obtained is crystallized twice from ether M.P. 164–167° C.; $[\alpha]_D^{24}$ —10° (1% in chloroform).

*Example 5*

A solution of 500 mg. of 4-methyl-17α-ethinylestra-1,3,5(10)-trien-17-ol in 25 ml. of trifluoroacetic anhydride is heated under reflux for 2 hours. The precipitated 4-methyl-17α-ethinylestra-1,3,5(10)-trien - 17 - ol, trifluoroacetate is isolated and crystallized twice from ether-methanol; M.P. 164–168° C.

I claim:

1. A 4-methyl-17α-ethinylestra-1,3,5(10)-trien compound having the formula

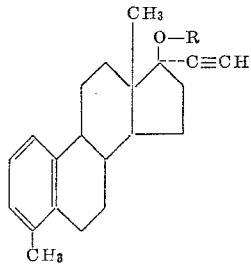

where R is a member of the class consisting of hydrogen, trifluoroacetyl, and lower alkanoyl.

2. 4-methyl-17α-ethinylestra-1,3,5(10)-trien-17-ol.
3. 4-methyl-17α-ethinylestra-1,3,5(10) - trien - 17 - ol, acetate.
4. 4-methyl-17α-ethinylestra-1,3,5(10) - trien - 17 - ol, propionate.
5. 4-methyl-17α-ethinylestra-1,3,5(10) - trien - 17 - ol, trifluoroacetate.

References Cited by the Examiner

UNITED STATES PATENTS

| | | | |
|---|---|---|---|
| 3,178,456 | 4/1965 | Wettstein et al. | 260—397.4 |
| 3,201,428 | 8/1965 | Bowers et al. | 260—397.4 |
| 3,202,684 | 8/1965 | Burn et al. | 260—397.5 |
| 3,211,725 | 10/1965 | Oberster et al. | 260—397.5 |

OTHER REFERENCES

Caspi et al., "Journal Chem. Soc.", May 1962, pp. 1710–1716 relied on.

Veno, "Chemical and Pharmaceutical Bulletin of Japan" (January 1964), vol. 12, pages 92–100.

ELBERT L. ROBERTS, *Primary Examiner.*

LEWIS GOTTS, *Examiner.*

E. L. ROBERTS, *Assistant Examiner.*